United States Patent [19]

Walsworth

[11] Patent Number: 4,629,836
[45] Date of Patent: Dec. 16, 1986

[54] METHOD AND APPARATUS FOR ACCESSING COMMUNICATION SYSTEMS

[75] Inventor: Richard L. Walsworth, Pittsford, N.Y.

[73] Assignee: TII Computer Systems, Inc., Copiague

[21] Appl. No.: 645,875

[22] Filed: Aug. 29, 1984

[51] Int. Cl.⁴ .............................................. H04B 3/46
[52] U.S. Cl. ......................................... 379/12; 379/18
[58] Field of Search ......... 179/175.3 R, 175, 175.2 C, 179/175.2 D, 84 VF; 375/10; 371/22; 320/14

[56] References Cited

U.S. PATENT DOCUMENTS

3,842,218 10/1974 DeLuca et al. .............. 179/175.3 R

Primary Examiner—Stafford D. Schreyer
Attorney, Agent, or Firm—Pennie & Edmonds

[57] ABSTRACT

An apparatus and method for accessing communication systems includes a microprocessor for controlling said accessing. Communication line access is accomplished by an interface with test trunk equipment and MDF shoes. Capability for generating dial pulse, DTMF and multifrequency dialing signals is included. Communications components and a test bus permit the apparatus to interface with a supervisor unit and a testing unit.

10 Claims, 11 Drawing Figures

METHOD AND APPARATUS FOR ACCESSING COMMUNICATION SYSTEMS

CROSS-REFERENCE TO RELATED APPLICATIONS

Related applications, incorporated herein by reference, are "Method and Apparatus for Supervising the Accessing and Testing of Communications Systems", Ser. No. 645,478, and "Method and Apparatus for Testing Communication Systems", Ser. No. 645,479 and "Method and Apparatus for Configurable Line Testing" Ser. No. 645,461 filed concurrently herewith and assigned to TII Computer Systems, Inc.

BACKGROUND OF THE INVENTION

This relates to the maintenance and testing of communication lines and, in particular, to the maintenance and testing of conventional telephone lines.

Communication lines require periodic testing, maintenance and repair. At first, telephone system operators employed an entirely manual process of accessing, testing and servicing subscriber lines. However, these manual procedures allowed inoperative lines to go undetected for long periods and frequently resulted in a substantial delay between the initial report of trouble on a line and the verification and identification of that trouble. Line trouble was often discovered only when a subscriber's service had been interrupted, and even after it was reported, a rapid, accurate and intelligent response to the trouble report or to a subsequent inquiry was impossible in the majority of circumstances. In addition, the speed and accuracy of certain line tests depended on the experience of the tester and upon how quickly information about the subscriber's telephone equipment could be manually retrieved from a file; and the whole process was very much labor intensive.

In an effort to acquire better line testing, maintenance and repair capabilities, in the 1970's American Telephone and Telegraph, Inc. developed and implemented Automatic Repair Service Bureaus (ARSBs) in the predecessors of the Regional Bell Operating Companies (RBOCs). See P. S. Boggs and M. W. Bowker, "Automated Repair Service Bureau: Evolution", *Bell System Technical Journal*, Volume 61, No. 6, Part 2, pp. 1097-1114 (July-August, 1982). The ARSBs utilized a Loop Maintenance Operating System (LMOS) and a Mechanized Loop Testing (MLT) system.

LMOS provides four basic services to the ARSBs. First, the system generates and maintains a data base containing very detailed information. Records in this data base, known as "line records," reflect such information as the telephone equipment in use at a subscriber's site, the electrical characteristics of this equipment, whether there are any unresolved reports of trouble on the line, and whether the subscriber's account shows an unpaid balance.

Second, LMOS performs computerized trouble report processing. When a trouble on a line is reported by a subscriber, an entry is made in the applicable line record. The telephone company employee receiving the subscriber's call can use the MLT system, described below, to perform some preliminary tests on the line and verify or discount the report. If the tests disclose no line trouble, the employee will inform the subscriber that the line is in working order and make an entry in the line record reflecting that fact. Alternatively, if the test results indicate that a trouble does exist, the employee's entry will indicate that further testing by MLT is required. Thus, LMOS allows the existence and status of a pending trouble report to be readily determined.

The third basic service provided by LMOS involves the generating of management and analysis reports by utilizing the information stored in its data base. These reports include analyses of the ARSBs' efficiency and the prediction and identification of problem areas in repair operations.

Finally, because LMOS keeps track of repair force locations and commitments, the system allows for efficient repair force deployment. This is particularly important when a subscriber is requested to remain at a site for repair operations. LMOS, as a provider of these services, clearly represents a material advance over prior manual record and report processing procedures.

An MLT system essentially performs computer controlled tests on the communication lines and interprets the results of those tests. The MLT system obtains information about the normal electrical characteristics of a subscriber's line from the LMOS database and uses it to generate a series of adaptive tests in order to determine the current status of the line. For example, the subscriber may use what is referred to as "inward-only" service, in which outgoing calls on the line are not permitted, and thus no dial tone is provided. There would be little point in running a test to detect a dial tone on such a line. In addition to information about the subscriber's termination equipment, LMOS also contains data describing central office equipment and outside-plant equipment on the line. This data is also required for meaningful MLT testing.

MLT accesses selected lines at and through communication test head hardware. The Test Head first ensures that the voltage on the line to be tested is not high enough to damage the testing equipment. Then, depending upon the manner in which a line is accessed, other preliminary tests may be performed to ascertain whether a given line is available for testing, including for example, whether the line is on intercept, or whether it is currently in use. If the line is available, MLT performs a series of diagnostic tests designed to determine the line's operational status. These tests typically include measurements of AC and DC voltage and current, resistance and capacitance measurements, dial tone detection, dial pulse and DTMF tests and noise checks. In addition, the MLT system can detect the existence of an open wire and determine the location of the break.

The MLT system then interprets the results of these tests in accordance with information acquired from the LMOS data base. Frequently, these results can be used to respond to a subscriber trouble report or inquiry while he is still on the line. In addition, a detailed analysis of the test results can be routed to repair service personnel to enable repair operations to be accomplished quickly and efficiently.

Because of cost and efficiency considerations, however, present implementations of the MLT systems are best suited for use only where the number of lines to be served exceeds 10,000. Each MLT currently relies extensively on the processing power of a single minicomputer, and failure of that machine results in a total failure of the MLT system.

SUMMARY OF INVENTION

The present invention is part of a method and apparatus for performing many of the same testing functions previously provided by devices such as the MLT system but at significantly lower cost and in significantly smaller equipment. Such apparatus comprises three interacting units, a test trunk access (TTA) unit for accessing communication lines and for performing certain preliminary tests upon said lines, a testing unit for testing such lines, and a supervisor unit for controlling the TTA unit. In the presently preferred embodiment, both the TTA unit and the testing unit are interfaced to and controlled by the supervisor unit. The supervisor unit is described in detail in the above-referenced application entitled "Method and Apparatus for Supervising the Accessing and Testing of Communication Systems" and the testing unit is described in "Method and Apparatus for Testing Communication Systems".

In an illustrative mode of operation, the supervisor unit of the invented apparatus determines which communication lines are to be tested, instructs the TTA unit to access these lines, and then causes the testing unit to test the lines and communicate the results back to the supervisor for storage and processing.

A plurality of cooperating TTA and testing units can be controlled by one supervisor unit. Furthermore, several independently functioning supervisor units, each having associated TTA and testing units, can be employed to service large number of lines. Thus, one advantage of the present invention is that it permits a system architecture utilizing distributed intelligence, wherein the failure of one TTA or a testing unit will not prevent other such units from functioning, and the failure of one supervisor unit will not impair the operation of other supervisor units and their associated TTA and testing units.

The TTA unit includes a microcomputer, which comprises a microprocessor, memory, I/O components for communicating with the supervisor unit and an optional terminal device, and a decoder for generating control signals for various line access and testing circuitry. Control and status ports distribute and sample control and status signals within the unit.

Testing circuitry includes dial pulse and DTMF generators for simulating subscriber equipment when testing lines inward to central office or other switching stations and for gaining access to lines, a dial pulse and DTMF detector for testing subscriber equipment and lines terminating at said equipment, a sleeve control circuit for gaining control of test distributor equipment, an on-hook/off-hook detector and a ring generator select circuit. Equipment is also provided for testing pay stations. Multiple frequency dialing is accomplished using DTMF generators coupled to frequency rate multipliers for selectively altering the source frequency provided to said DTMF generators.

Line testing and access components are advantageously designed to be able to interface with a variety of telephone switching equipment. For example, DTMF, dial pulse and multiple frequency (MF) dialing methods are all supported. Furthermore, the TTA can signal the central office to supply a dial tone to a line using loop start and ground start methods, respectively. The TTA receives different commands from the supervisor depending upon the type of telephone equipment used to access and test the selected lines.

Line access and seizure may be accomplished using several methods. First, the TTA includes an interface with a telephone system test distributor using a test trunk line. Lines can be accessed conditionally through the test trunk, which requires that the subscriber loop be unpowered and thus not busy, or unconditionally, which enables the TTA to bridge onto a line already in use. Second, the TTA can use main distribution frame (MDF) interface lines to access and test a subscriber loop through MDF switching equipment, as well as to simulate subscriber equipment and test lines running into switching equipment. The TTA provides the testing unit with access to selected and seized lines through a test unit interface.

An additional advantage of the present invention that both supervisor and TTA units are each capable of being contained on one circuit board, thus minimizing the size and complexity of the overall system while increasing its reliability and decreasing its cost.

BRIEF DESCRIPTION OF THE DRAWING

These and other objects, features and advantages of the invention will be more readily apparent from the following detailed description of the preferred embodiment of the invention in which.

DETAILED DESCRIPTION OF THE PREFERRED EMBODIMENT

Figure 1:
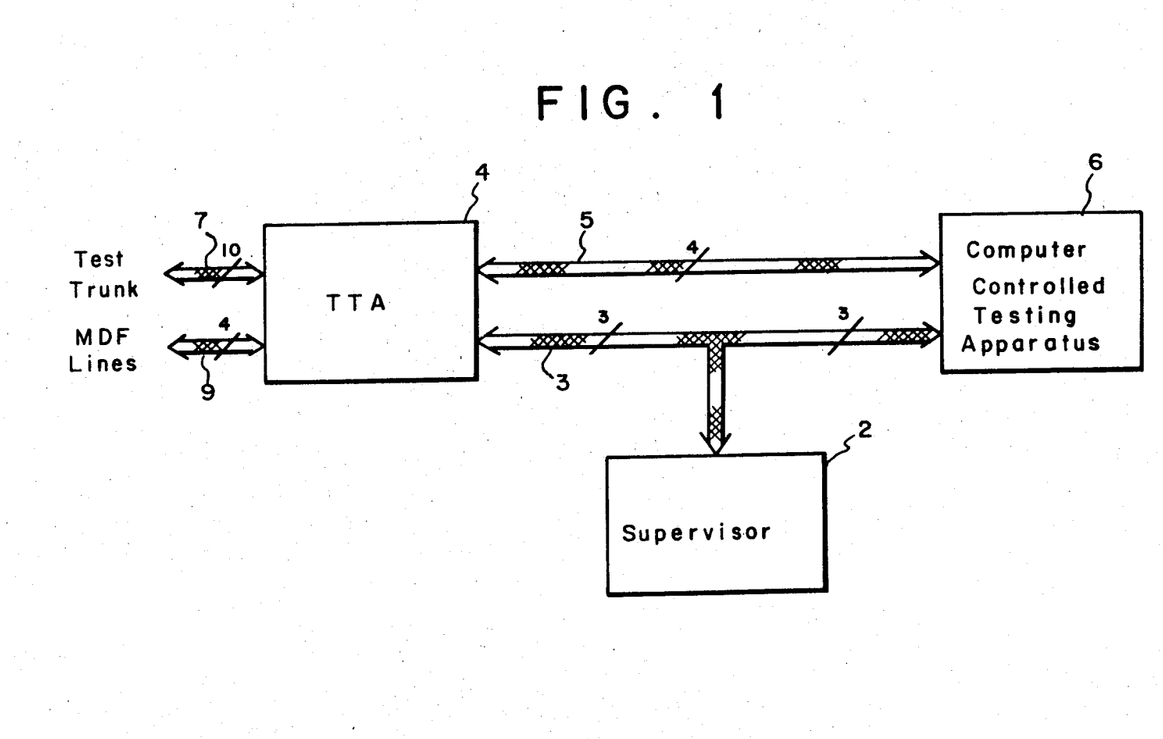
FIG. 1 is a block diagram showing the presently preferred embodiment of the invented apparatus connected to the supervisor and testing units.

As shown in FIG. 1, a complete system for maintenance and testing of communication lines comprises a supervisor unit 2, a test trunk access (TTA) unit 4 and a testing unit 6. The supervisor is connected to the testing unit and to the TTA by a serial synchronous interface using a three-wire line 3. The TTA unit is connected to the testing unit by a four-wire line 5. When a given set of communication lines is to be tested, the supervisor unit uses line 3 to instruct the TTA to access the lines using ten-wire test trunk 7 or four-wire MDF interface line 9. The TTA may then perform preliminary tests, described below, in order to determine whether access to the lines can be obtained using the access means selected.

Assuming access is permissible, the TTA siezes the lines through either test trunk 7 or MDF line 9 and couples said lines to line 5. The TTA then informs the supervisor that a successful line seizure has occurred. The supervisor, through three-wire line 3, then instructs the testing unit to test the seized lines using line 5. When testing is completed, notifies the testing apparatus notifies the supervisor unit and transmits the test results to said unit over line 3. The supervisor then performs any additional computations required to determine communication line characteristics. Details of the supervisor unit are set forth in the above-referenced "Method and Apparatus for Supervising the Accessing and Testing of Communication Systems." The testing unit and testing method are described in the above-referenced application "Method and Apparatus for Testing Communication Systems."

Figure 2:
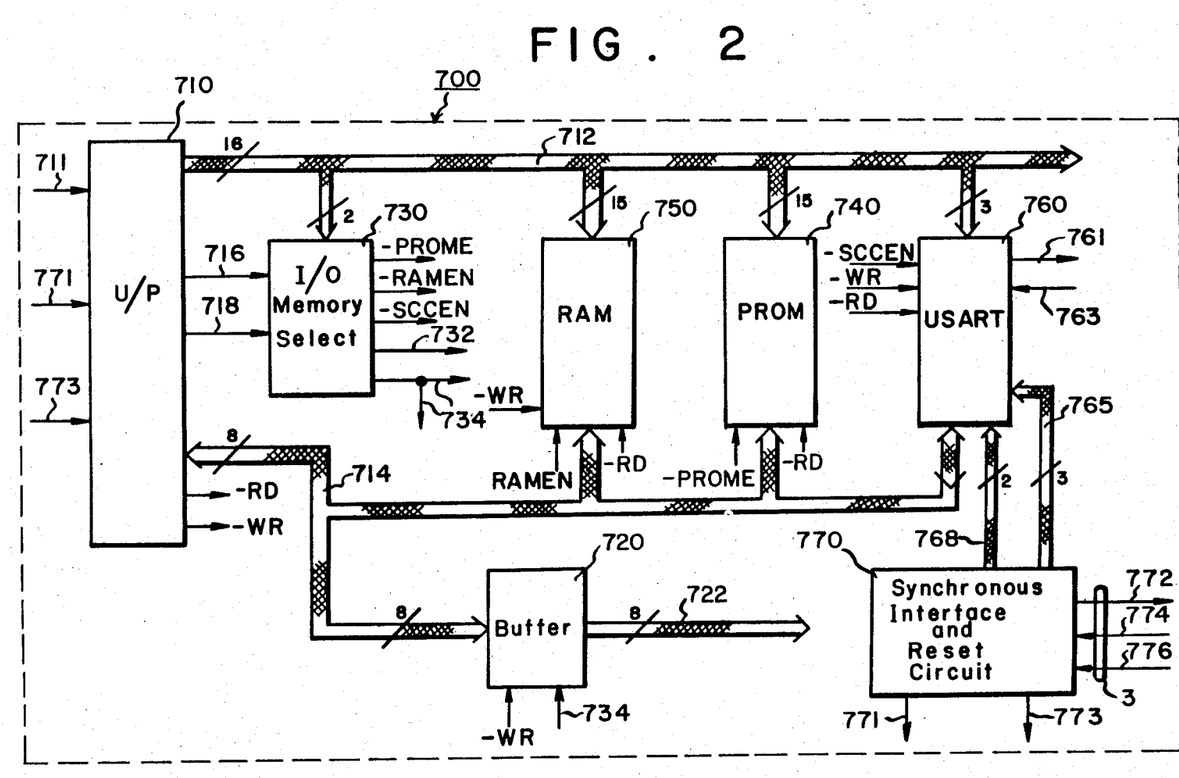
FIG. 2 is a block diagram of the TTA microcomputer in its presently preferred embodiment, including memory, decoders, a buffer, and interconnecting busses.

As shown in FIG. 2, TTA unit 4 comprises a microprocessor 710, a buffer 720, an I/O memory select 730, a read/write (RAM) memory 750, a programmable read only memory (PROM) 740, a universal synchronous-/asynchronous receiver transmitter (USART) 760 and a reset circuit 770. These elements are interconnected by eight-bit bidirectional data and buffered data busses 714, 722, an address bus 712, and various control lines.

Microprocessor 710 in the presently preferred embodiment is a Z-80 chip, but it should be noted that several other devices can successfully serve as the microprocessor unit. Clock pulses, illustratively at 1.92 MHz, drive the Z-80 microprocessor through line 711. The microprocessor uses address bus 712 to select the devices it seeks to communicate with, and inputs and outputs data through bidirectional data bus 714. Buffer 720, illustratively a 74245 device, is interposed between data bus 714 and buffered data bus 722 for isolating memory data from I/O data. The buffered data bus is coupled to various devices in the apparatus as described below.

An interrupt and a reset signal are supplied to the microprocessor by lines 771 and 773, respectively. Read (−RD) and write (−WR) control lines are used by the microprocessor to instruct certain devices to place data on, or accept data from, data bus 714 and buffered data bus 722, and for other control functions. Read and write control lines, together with two lines of address bus 712, memory request line 716 and IO request line 718, are decoded by IO/memory select circuit 730 to provide IO control signals on lines 732 and 734, and PROM enable (−PROME), RAM enable (−RAMEN) and USART output enable (−SCCEN) control signals. The presently preferred embodiment utilizes two 74139-type 2-to-4 decoder chips to implement the IO/memory select circuit 730.

Programmable read only memory (PROM) 740 holds the microprocessor software instructions and provides these instructions to the microprocessor. The PROM device may be, for example, a programmable read only memory such as a 2764, a 27128 or a 27256-type component, and is addressed by 15 lines of the address bus 712. In addition, the microcomputer includes a random access memory (RAM) 750 of the 6116, 6264, or a similar type, addressed by 15 lines of address bus 712, which permits the microprocessor to store and access data. Both the RAM and PROM chips output data to the data bus 714, and the RAM device accepts data from said bus.

A communications interface is provided by Universal Synchronous Asynchronous Receiver Transmitter (USART) 760. The USART is illustratively a Z8530, but other appropriately selected devices are easily substituted. The USART receives control signals from two lines of the address bus, the −RD and −WR lines, and the −SCCEN line; and data bus 714 is used to transfer data between the USART and the microprocessor. The serial asynchronous component of the USART includes a transmit data line 761 and a receive data line 763.

Synchronous interface and reset circuit 770 in conjunction with USART 760 provide a serial synchronous interface with the supervisor unit 2, of FIG. 1. Line 772 transmits data to the supervisor and line 774 receives data from the supervisor. A reset signal from the supervisor is received through line 776. Lines 772, 774 and 776 comprise line 3 shown in FIG. 1. Two wire line 768 supplies status and interrupt signals, respectively, from microprocessor 710 to synchronous interface and reset circuit 770. Using signals from lines 768 and 776, the circuit generates control signals which are selectively applied to interrupt line 771 and reset line 773.

Figure 3:
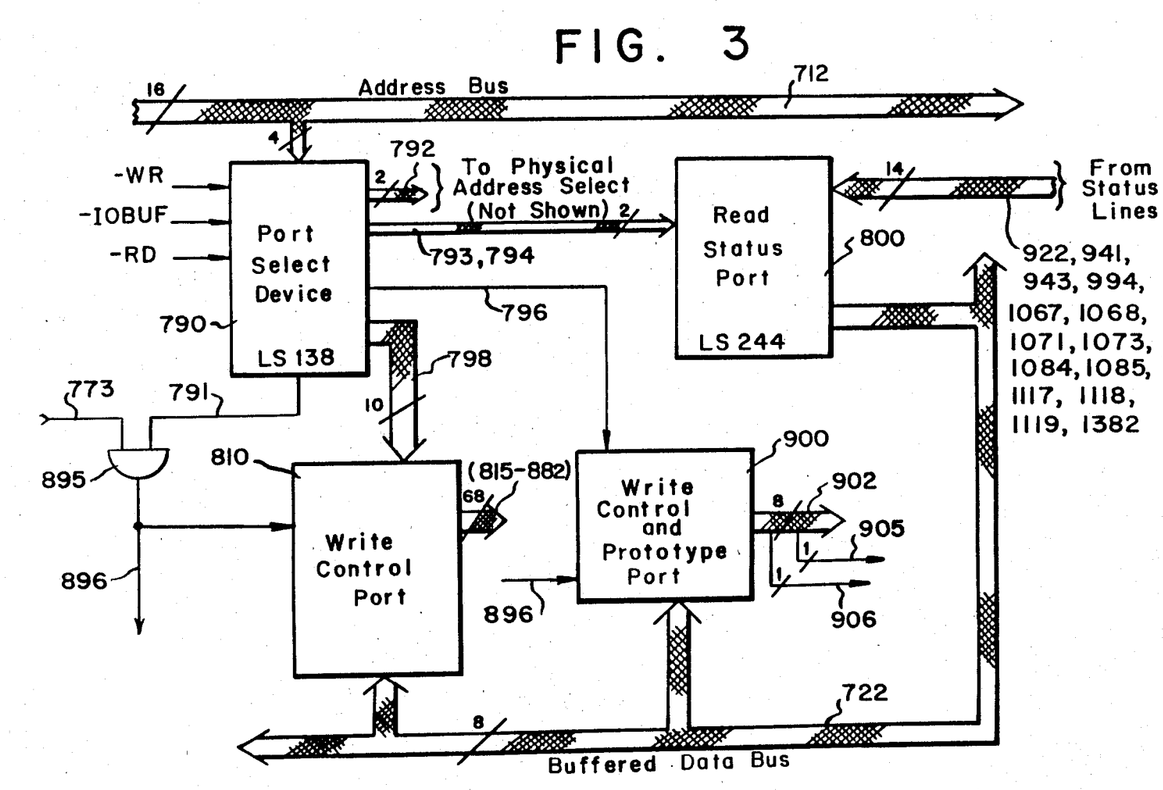
FIG. 3 depicts read status and write control ports, as well as circuitry for selecting said ports.

FIG. 3 depicts a portion of the apparatus used to store status information and generate control signals. Such apparatus comprises a read status port 800, which samples and stores status information, a port select device 790 which controls status port 800, and a write control port 810 and write control and prototype port 900 for supplying control signals to various components of the TTA unit. Also shown are associated control and status lines, buffered data bus 722, and address bus 712.

Port select device 790 which, in the presently preferred embodiment consists of three 3-to-8 74LS138 decoders, uses control signals −WR, −RD, −IOBUF, and signals on four lines from address bus 712 to generate a reset signal on line 791 and select signals on lines 792–794, 796 and ten-wire line 798. When selected by the port select signals provided by lines 793 and 794, read status port 800 accepts and stores data from status lines 922, 941, 943, 994, 1067, 1073, 1084, 1085, 1117–1119, 1382, thereby permitting microprocessor 710 to acquire said data through buffered data bus 722. Illustratively, read status port 800 comprises two 74244-type devices.

Write control port 810, comprising ten 74273 devices, is also coupled to buffered data bus 722. This port accepts eight bits of control signal data from the microprocessor through said bus under control of signals from port select device 790 on ten-wire line 798 and provides the control signal data to various components of the TTA unit over lines 815–889. The write control port is cleared using line 896, which conveys a reset signal from AND gate 895. Said gate receives reset signals from both synchronous interface and reset circuit 770 and port select device 790.

Write control and prototype port 900, illustratively a 74273 component, accepts data from buffered data bus 722 when it receives an appropriate control signal through line 796. Port 900 couples control signals to eight-wire line 902, which is reserved for use with an expansion board, and to lines 905 and 906 for other control purposes. A reset signal on line 896 clears port 900.

Figure 4:
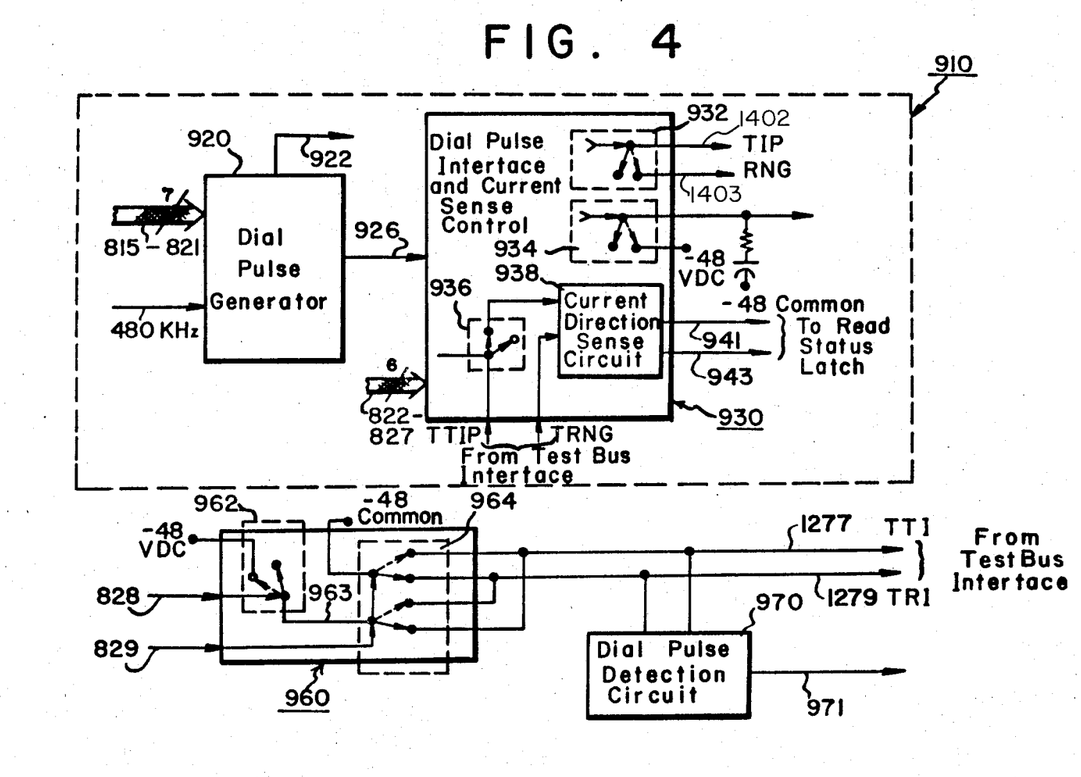
FIG. 4 shows a dial pulse generator for dialing using dial pulses, a dial pulse interface, a relay used in powering a subscriber loop, and a dial pulse detector.

The TTA unit can dial telephone numbers using three methods, dial pulse and dual tone multi-frequency (DTMF) and MF generation. FIG. 4 shows circuitry 910 used to generate dial pulse trains, including a dial pulse generator 920 and a dial pulse interface and current sense circuit 930. Dial pulse interface and current sense circuit 930 comprises relays 932, 934 and 936, current direction sense circuit 938, and means for decoding control signals.

Dial pulse generator receives control signals and digit selection data over lines 815–821 and an oscillating signal illustratively at 480 kHz and outputs dial-pulse-in-use status signal over line 922 and dial pulse signals via line 926. Interface 930 receives dial pulses from the generator 920 and is controlled by signals provided over lines 822–827. Relay 932 in said circuit selectively couples together tip and ring lines 1402, 1403, relay 934 selectively couples line 935 to a conventional −48 Volt D.C. common; and relay 936 selectively couples tip line from a test bus interface FIG. 9 to a current direction sense circuit 938.

In accordance with control signals and digit selection data provided through lines 815–821, dial pulse generator 920 couples a pulse train representing the digit to be dialed to dial pulse interface and current sense circuit 930. At the same time, it generates a MUTE status signal on line 922 to inform the processor that the dial pulse generator is in use. Control signals supplied by lines 822–827 and the dial pulse generator output are used by dial pulse interface and current sense circuit 930 to control relays 932, 934 and 936. Relay 932, under direction of the dial pulse generator output and the above mentioned control signals, generates the make-break pulse sequence constituting the dial pulse signals by coupling together tip and ring lines. Relay 934 generates a stepper signal by coupling line 935 to a ground, illustrative −48VDC common. When used with certain telephone switching equipment, the stepper signal permits the TTA unit to access a sequential series of lines without dialing each line. Current direction is detected when relay 936 causes current to flow through diodes in current direction sense circuit 938 which sense current direction through ttip and trng lines and supply current direction status signals to lines 941 and 943.

Also shown in FIG. 4 is a loop power/ground circuit 960, comprising single pole, single throw relay 962 and double pole, double throw relay 964, as well as a dial pulse detection circuit 970. Circuit 960 is used for powering a loop with D.C., for performing loop start and ground start operations. Loop start operations inform the central office that a phone has gone off-hook and that a dial tone is required. Ground starts are used by private branch exchanges (PBX's) for an identical purpose.

When an appropriate control signal is presented by line 828, loop power/ground start circuit 960 couples power, illustratively −48VDC, to line 963. When relay 964 is in the switching position shown, line 963 is coupled to line 1277 and line 1279 to −48V common node. When the relay is in the other switching position, line 963 is coupled to line 1277 and line 1279 is coupled to said −48V common node. Lines 1277 and 1279 can be selectively coupled to the subscriber loop.

Figure 6:
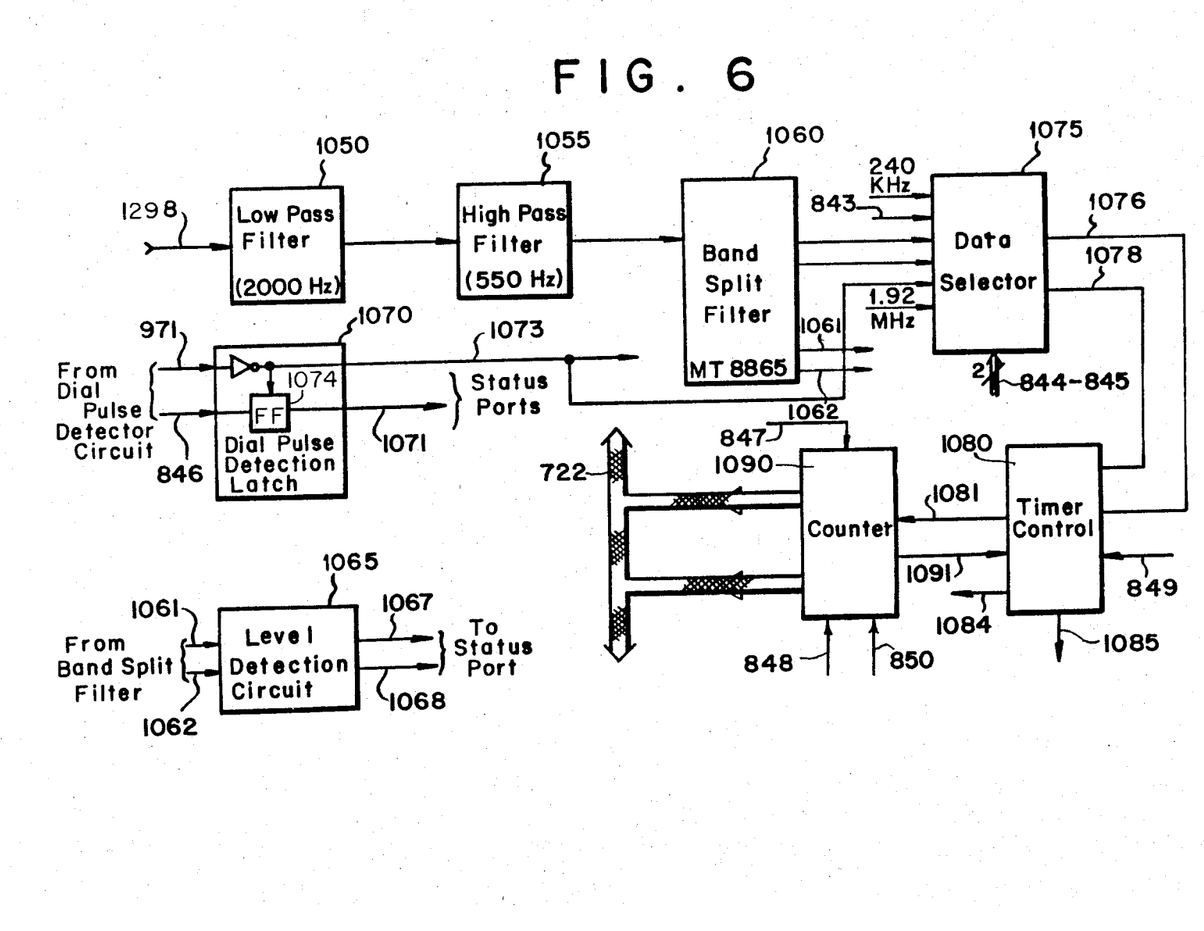
FIG. 6 depicts DTMF detection means and part of dial pulse testing circuitry.

Dial pulse detection circuit, which is coupled to lines 1277 and 1279, outputs a contro signal to a dial pulse detection latch shown in FIG. 6 over line 971, when dial pulses are detected on lines 1277 and 1279.

Figure 5:
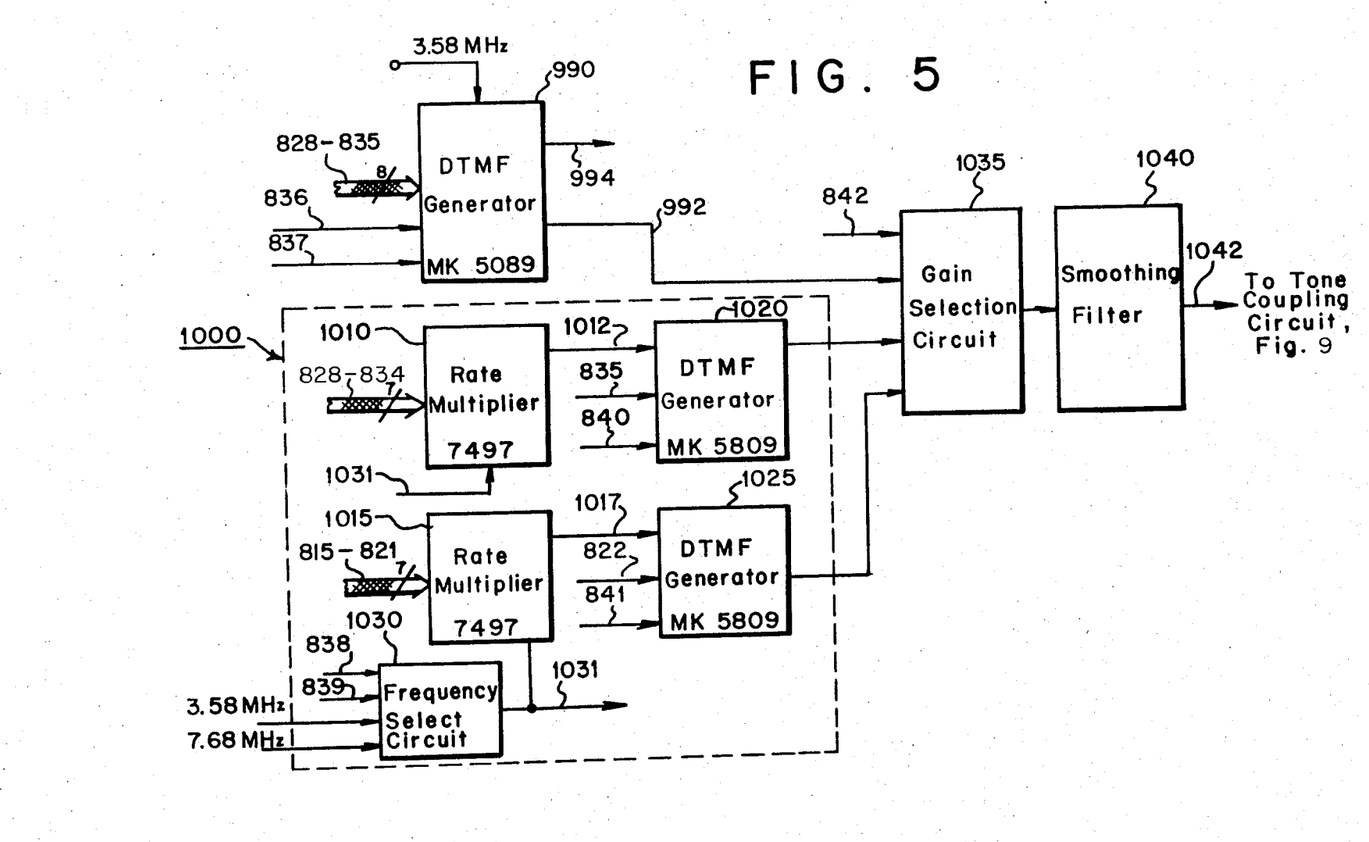
FIG. 5 is a block diagram of a DTMF generator for dialing using DTMF signals, multiple frequency generation circuitry, a gain selection circuit and a smoothing filter.

As shown in FIG. 5, DTMF and MF circuitry comprises a DTMF generator 990, a multiple frequency (MF) generation circuit 1000 including rate multipliers 1010 and 1015, DTMF generators 1020 and 1025, and a frequency select circuit 1030, a gain selection circuit 1035, and a smoothing filter 1040. DTMF generator 990 generates DTMF tones, while multiple frequency generation circuit 1000 generates single or dual tones at a variety of frequencies. Within circuit 1000 rate multipliers 1010 and 1015 output a signal which is some fraction of an input frequency provided by frequency select circuit 1030, and DTMF generators then divide the fractionalized signal. DTMF generators are, illustratively, MK 5089 devices and rate multipliers are 7479-type components. Frequency select circuit 1030 preferably comprises two conventional AND gates and an OR gate, and permits two frequency inputs, illustratively 3.58 MHz and 7.68 MHz, to be selectively coupled to line 1031, depending upon control signals provided by lines 838 and 839.

In accordance with control signals received through lines 828–835, 836 and 837, DTMF generator mixes a signal from a high group of frequencies, namely 1209, 1336, 1477 and 1633 HZ, with a signal from a low group of frequencies 697, 770, 852 and 941 HZ, and outputs a DTMF signal on line 992.

Multiple frequency generation is accomplished in the presently preferred embodiment using rate multipliers 1010 and 1015 in combination with DTMF generator chips 1020 and 1025 and frequency select circuit 1030. When appropriate control signals are received from line 838, line 839 or both, the select circuit supplies a clock frequency to line 1031. Data on lines 828–833 and 815–820 supplied from control port 810, are used to select a multiplier value for rate multipliers 1010 and 1015, respectively. These values are illustratively between 0 and 63. When enabled by signals on lines 834 and 821, respectively, multipliers 1010 and 1015 multiply the clock pulse rate supplied via line 1031 by the rate value, divide it by 64 and couple the resulting frequency signal to DTMF generator 1020 through line 1012 or DTMF generator 1025 through line 1017. Each DTMF generator divides the frequency of the received signal by 2176 and couples the synthesized signal to gain selection circuit 1035.

Gain selection circuit 1035 amplifies the generated signals received from line 992 and DTMF generators 1020, 1025. When an appropriate control signal is present on line 842, this circuit increases gain further to effect a "howler" signal, such as that which is used when a phone is left off-hook and unused for an extended period. The amplified signal is next passed through a smoothing filter 1040 for imparting a smooth sinusoidal form to said signal and is ultimately coupled to transformer coupling circuit 1290 shown in FIG. 9.

The components shown in FIG. 6 perform DTMF AND MF detection, and in conjunction with dial pulse detector 970 of FIG. 4 also measure dial pulses. These components comprise a low pass filter 1050, a high pass filter 1055, a band split filter 1060, a level detection circuit 1065, a dial pulse detector latch 1070, a data selector 1075, a counter control 1080 and a counter 1090.

High pass and low pass filters 1050, 1060 preferably eliminate frequencies below 550 Hz and above 2000 Hz, respectively. Band split filter 1060, which illustratively is an MT8865 device, divides a received composite tone into high and low frequency components. Level detection circuit 1065 examines these component signals and outputs status signals indicating whether the tested component contains a tone at a level acceptable for DTMF signals.

Dial pulse detector latch 1070 comprises a D-type flip-flop and an inverter. Latch 1070 inverts and stores a signal received from dial pulse detection circuit 970, FIG. 4, when an appropriate control signal appears on line 846, and also couples the inverted signal to line 1073. Data selector 1075 is a 74153 device and, in accordance with control signals provided by lines 843-845, couples signals from the band split filter 1060, dial pulse detection latch 1070, and 240 KHz and 1.92 MHz pulses to lines 1076 and 1078. Finally, counter control 1080 comprises four 7474 flip flops which retain control signals for counter 1090. Said counter can be constructed using, for example, four 74161 components.

DTMF tones are decoded by splitting the signal into its high and low frequency components using band split filter 1060 and then ascertaining the frequency of each component using counter 1090 as detailed below.

Figure 9:
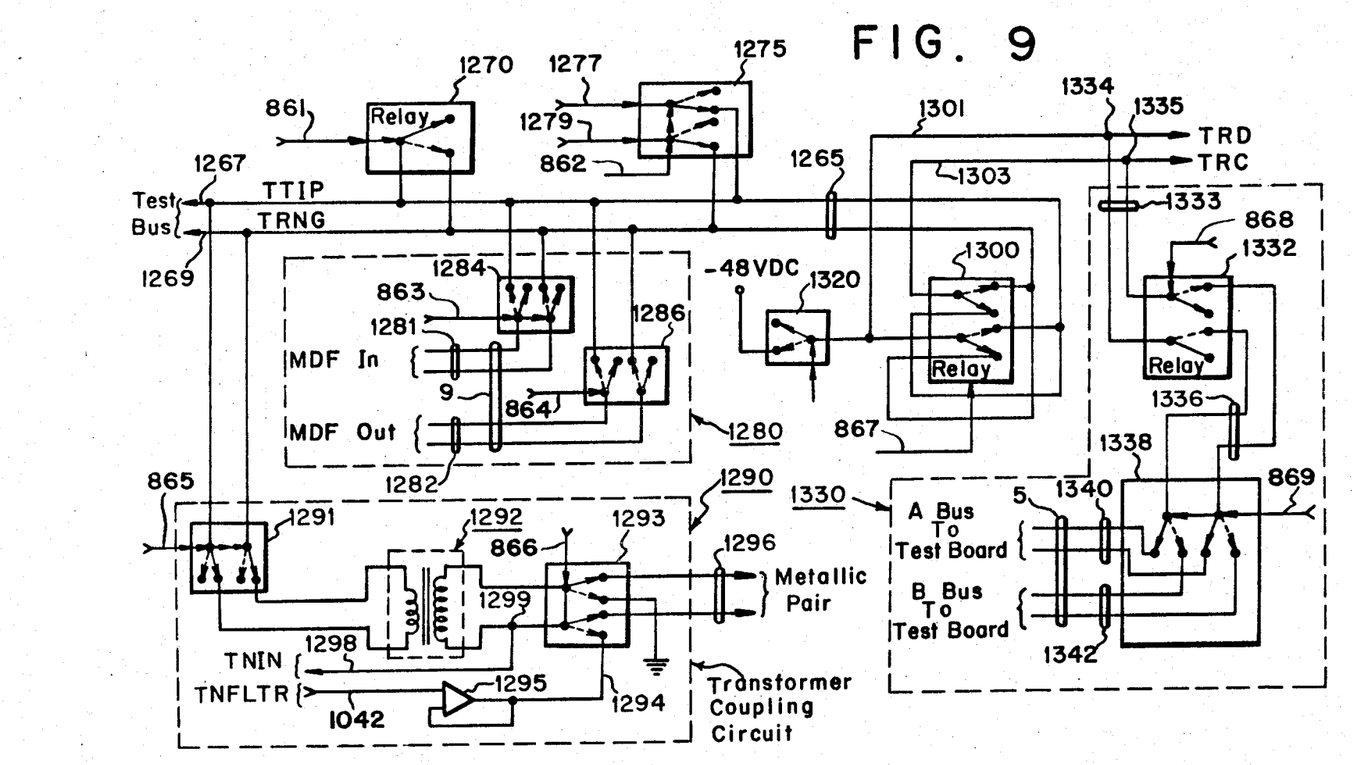
FIG. 9 depicts a test bus interface circuit for coupling tones to and receiving tones from subscriber loops, for interfacing with main distribution frame equipment, and for providing testing unit 30, FIG. 1, with access to seized lines.

Low pass filter 1050 receives a signal from transformer coupling circuit 1290 of FIG. 9, on line 1298. It filters out all frequencies above an illustrative 2000HZ, and presents the resulting output to high pass filter 1055. High pass filter 1055 filters out all frequencies below an illustrative 550HZ and supplies the filtered signal to band split filter 1060. Band split filter 1060 receives the output of high pass filter and splits the signal into high and low frequency bands. High frequency group signals and low frequency group signals are then supplied to level detection circuit 1065 by lines 1061 and 1062, respectively. The circuit outputs status signals on lines 1067, 1068 whenever it receives tones at appropriate proper level from lines 1061, 1062, respectively.

Dial pulse detection latch 1070 receives control signals from write control port 810 and from dial pulse detection circuit 970 of FIG. 4. When a pulse is detected by dial pulse detection circuit, a control signal from that detection circuit is inverted by the dial pulse detection latch, and is coupled to lines 1071 and 1073. The inverted signal is also stored in latch 1074 from which it may be cleared by line 846. Thus, line 1073 permits the microprocessor to continuously detect the presence or absence of a dial pulse, while line 1071 provides a constant status signal from the time a pulse is detected until line 846 clears the latch.

In accordance with select control signals on lines 843-845, data selector 1075 selectively produces on line 1076 an output related to one of the high frequency or the low frequency output from band split filter 1060 or dial pulse detection latch output, and further couples a clock signal such as 240 KHz or 1.92 MHz clock pulse signal to line 1078. For the high and low frequency inputs, data selector 1075 is, in effect, a zero crossing detector, as a high TTL-level signal will be output by selector 1075 when the oscillating signal from filter 1060 becomes positive. A high TTL-level signal will also be provided by the selector while a dial pulse is detected.

Counter 1090 measures the time between successive high TTL-level signals on line 1076. When enabled by a signal on line 849, counter control circuit 1080 causes counter 1090 to start counting at a rate determined by the frequency supplied through data selector 1075, line 1078, counter control 1080 and line 1081. The next high TTL-level signal, which may represent either a completed cycle or completed dial pulse, depending on the input provided to the data selector, stops the counter and causes a status signal to be sent by counter control circuit 1080 to read status port 800, FIG. 3, via line 1085, where it can be sampled by the microprocessor. Using control signals on lines 847 and 848, the microprocessor reads the counter values through buffered data bus 722, computes frequencies or dial pulses and determines the number represented thereby. The microprocessor also clears counter 1090 by sending a control signal to counter control 1080 through write control port 810 and line 850. In response to this signal, counter control clears counter 1090 using line 1085. Counter overflow status is conveyed to counter control via line 1091 and to the microprocessor across line 1084 and through read status port 800. In the event of a counter overflow, the counter control circuit is reset by the processor using a control signal through write control port 810 and line 850.

Figure 7:
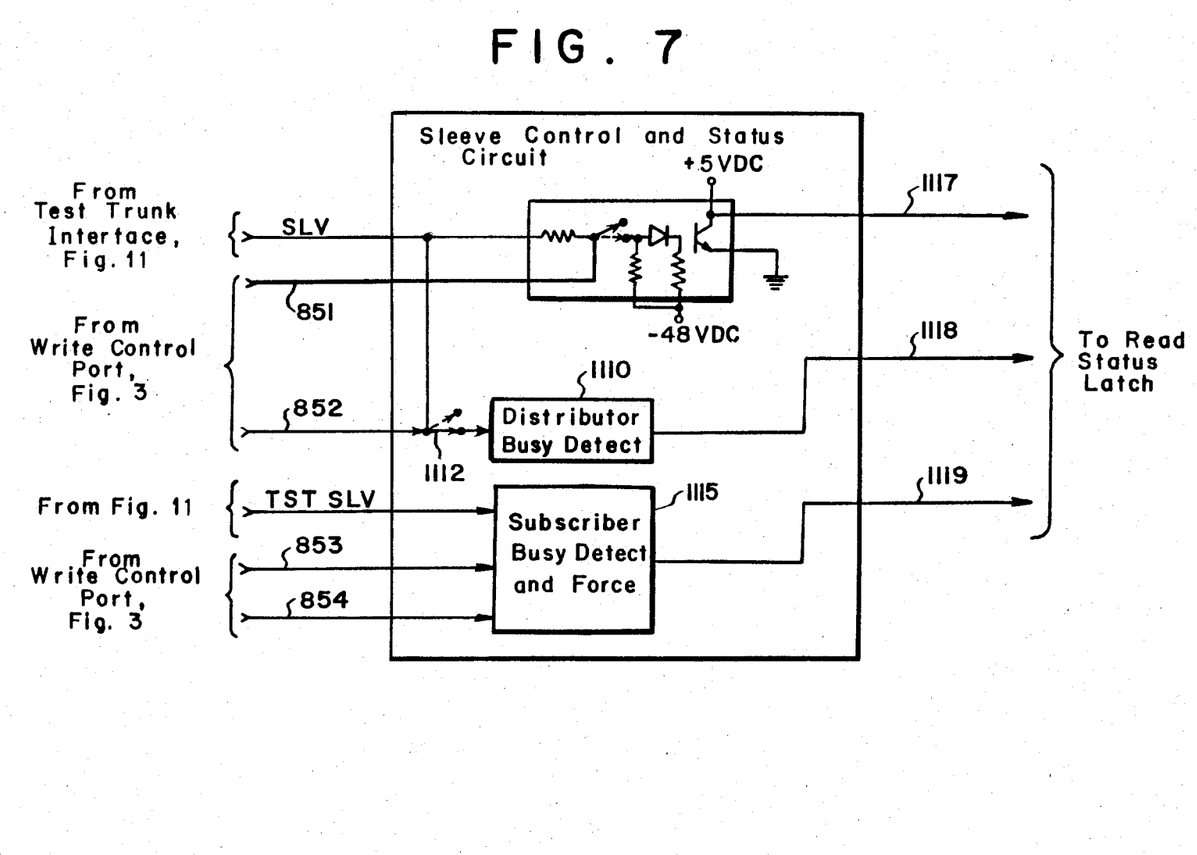
FIG. 7 shows a sleeve control and status circuit which controls the sleeve lead of the test trunk and samples status of test distributor equipment and a subscriber loop.

FIG. 7 shows a sleeve control and status circuit 1100 comprising a TD seize circuit 1105, a distributor busy detect circuit 1110, and a subscriber busy detect circuit and busy force circuit 1115 for manipulating sleeve line and TSTSLV lines according to control lines 851-854 and providing status information to microprocessor 710 through lines 1117-1119. The TTA unit of the invented apparatus can access communication lines through a Test Trunk or a main distribution frame (MDF) interface. These interfaces and the lines coupled thereto are discussed in detail below. Sleeve control and status circuit controls use sleeve line and TSTSLV line to implement various control and status determination functions. When accessing a line through the test trunk 7 of FIG. 1, the TTA unit must first check whether the test distributor is busy. An appropriate control signal on line 852 causes relay 1112 to couple the sleeve to distributor busy detect circuit 1110, which checks for ground potential on the sleeve, indicating the distributor is not busy. Line 1118 conveys a status signal to read status port 800, from which the microprocessor can determine that the distributor is busy. If it is not busy, the distributor is then seized, illustratively by using relay 1107 to couple −48 VDC through a low resistance to the sleeve line. The diode shown in circuit 1105, senses current through the sleeve in order to test for a break in the sleeve lead, and couples a status signal to line 1117 when the proper amount of current is present. The distributor can now be used to access a subscriber loop using DTMF or MF signals applied to the distributor via test trunk interface, FIG. 11.

After the TTA dials a line, it may check that line for a busy condition using subscriber busy detect and force circuit 1115, which is enabled by an appropriate control signal on line 853. If the line is not busy, the circuit 1115 can force it into a busy condition by coupling the TSTSLV to ground or can access the unpowered loop using the test trunk interface of FIG. 11. Accessing a line in this manner is called "conditional access". Alternatively, if the line is busy, the TTA can "bridge on" the line directly using the test trunk 7 and test trunk interface, FIG. 11.

Figure 8:
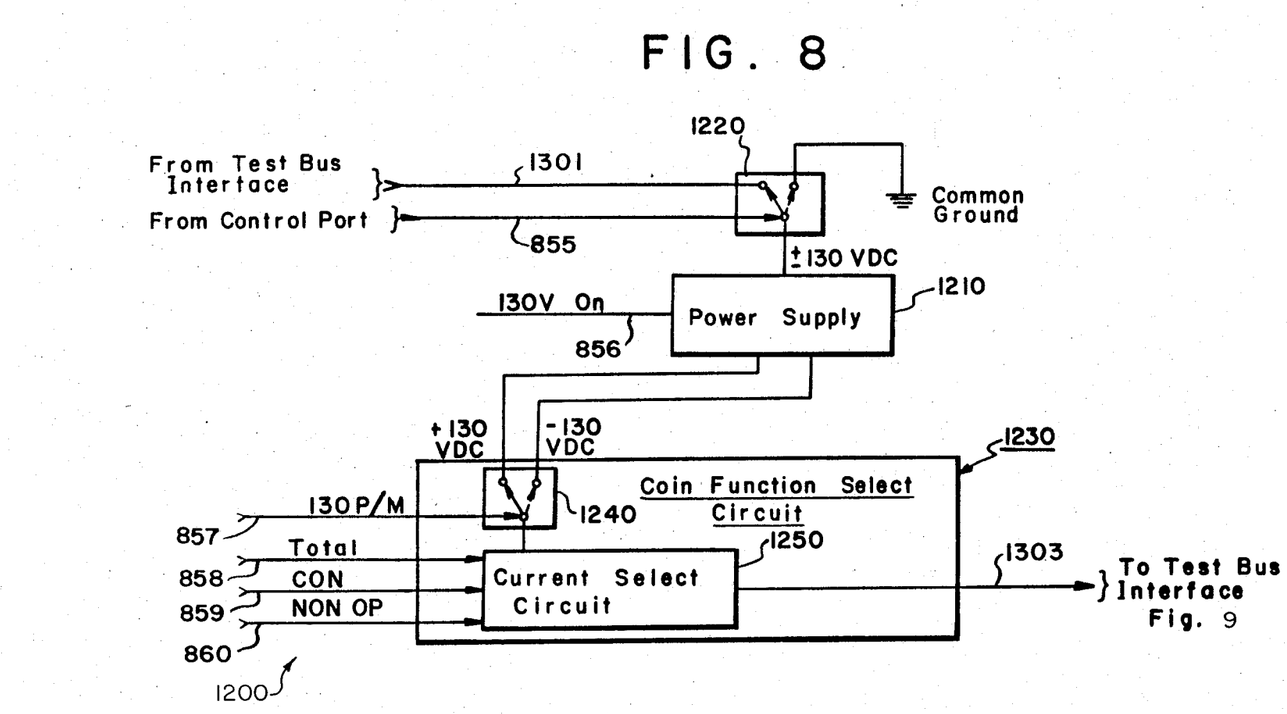
FIG. 8 illustrates coin function apparatus for testing various pay phone capabilities.

The TTA unit tests various coin functions of pay phones using the coin test circuitry 1200 in FIG. 8, which includes a power supply 1210, a relay 1220, and a coin function select circuit 1230, together with various control lines. Power supply 1210 provides power for coin function testing and relay 1220 selectively couples said power to line 1301 or to ground. Coin function select circuit 1230 comprises current selection circuit 1250, for selecting different current levels, and relay 1240, for selectively coupling a positive or a negative potential to the current select circuit.

Coin function operating power, illustratively 130 VDC, is applied by power supply 1210 to a subscriber loop through lines 1301 and 1303 which are ultimately coupled to said loop. Power supply, when operated by a signal on line 856, applies +130 VDC and −130 VDC to different terminals of relay 1240, whereby potentials of opposite polarity are made available to current select circuit 1250 in accordance with a control signal to said relay via line 857. In addition, an appropriate control signal on line 856 causes relay 1220 to selectively couple +/−130 VDC, depending upon the polarity selected by relay 1240, to line 1277 or to a common ground terminal, resulting in a potential of one polarity being applied to line 1301 and a potential of opposite polarity being applied to line 1303.

Current select control lines 858-860 select the level of current which will flow from the coin function select circuit 1230 through the subscriber loop and the selected pay phone. By manipulating the current level of a signal applied to a pay phone, the TTA unit can test the operation of the coin return solenoid and lever in such phone, test the above-mentioned parts without actually collecting any deposited coins, or can reset a totalizer mechanism which is also contained in said pay phone.

A two-wire test bus 1265 shown in FIG. 9 is used to couple signals between various testing components and lines accessed by the TTA unit. In accordance with present telephony convention, one wire of said bus is denoted a ttip line 1267, as it is nominally connected to the tip lead of a communication line, and the other wire is denoted a trng line 1269, as it is nominally connected to a ring lead of said line. FIG. 9 shows a test bus interface, comprising relays 1270 and 1275, a MDF interface 1280, a transformer coupling circuit 1290, relays 1300 and 1320, and a testing unit interface 1330.

Relay 1270, selectively couples together ttip and trng, relay 1275 applies power to the test bus using lines 1277 and 1279, and MDF interface 1280 couples ttip and trng either to two-wire MDFIN line 1281 or to two-wire MDFOUT line 1282. Transformer coupling circuit 1290 permits tones to be coupled to and received from test bus 1265, relay 1320 couples an illustrative −48 VDC potential source to line 1301 and relay 1300 permits ttip or trng to be coupled to said source for providing a permanent signal release (PSR) signal to ttip or to trng. Finally, a testing unit interface 1330 couples the test bus to a testing unit such as testing unit 6 shown in FIG. 1.

When operated by control line 861, relay 1270 couples ttip to trng, thereby shorting tip and ring wires of a telephone line, to which ttip and trng are nominally connected. D.C. power is supplied to the test bus over lines 1277 and 1279 through relay 1275, when said relay receives an appropriate control signal from line 862. Thus, a subscriber loop which has been conditionally accessed can receive power, illustratively −48VDC, from the test bus 1265, through test trunk interface, described below, and test trunk 7, FIG. 1.

MDF interface 1280 comprises double pole, double throw relays 1284 and 1286, which when operated by control lines 863 and 864, respectively, couple the test bus to MDFIN wire pair 1281 or MDFOUT wire pair 1282, respectively.

In addition, to accessing telephone communication lines using a test trunk 7, FIG. 1, the TTA unit can access lines using MDFIN and MDFOUT pairs, which comprise four-wire MDF line 9, FIG. 1. In each of said wire pairs, one wire carries signals normally carried by a tip wire and the other carries signals normally carried by a ring wire. Communication lines leading into main distribution frame (MDF) switching equipment from subscriber loops can be accessed using MDFIN wire pair 1281 which in the presently preferred embodiment may be manually coupled to said lines. Furthermore, subscriber loops can be accessed over MDFOUT wire pair 1282 which may be manually coupled to the selected loop.

The TTA unit uses a transformer coupling circuit 1290 to apply tones to and receive tones from test bus. The circuit comprises a transformer 1292, a double pole, double throw relay 1291 for coupling the test bus to first and second leads of the secondary coil of said transformer, a relay 1293 for selectively coupling first and second leads of the primary coil of transformer 1292 to wire pair 1296 or to ground potential and line 1294, and an isolator element 1295 for preventing interference with the tone generation circuitry shown in FIG. 5, which provides signals to the coupling circuit via line 1042.

Tones are coupled to and received from test bus by presenting an appropriate control signal via line 865 to relay 1291 and causing said relay to close its contacts. Signals can then pass from test bus 1265 over transformer 1292 and can be sampled by the TTA unit using line 1298, which is coupled to a first lead of the primary coil of the transformer at node 1299. Tones generated by tone synthesizing components of FIG. 5 may be coupled to the test bus by passing said tones over line 1042 through isolator 1295 to relay 1293 and applying an appropriate control signal over line 866 to said relay, whereby line 1294 is selectively coupled to said first lead of the primary coil, thus permitting the tone to pass across transformer coupling to test bus 1265.

Alternatively, when a control signal causes relay 1293 to couple first and second leads of the primary coil of transformer 1292 to wire pair 1296, tones can be coupled to and received from test bus 1265 through said wire pair, so as to provide a metallic coupling between the TTA unit and a supervisor unit, such as the one shown in FIG. 1.

A permanent signal release (PSR) which typically comprises a −48VDC signal, can be applied to the test bus and thus ultimately to a communication line by relay 1320, which is controlled by line 867. This signal causes Central Office switching equipment to release a line which is currently in use so that it is made available for access by the TTA.

Test unit interface 1330 provides a means for coupling the test bus to a testing unit, such as testing unit 6 in FIG. 1, and comprises a double pole, double throw relay 1332 for coupling wire pair 1333, which is coupled to test bus 1265 at nodes 1334, 1335, to wire pair 1336, and double pole, double throw relay 1338 for coupling wire pair 1336 to a testing unit through wire pair 1340 or wire pair 1342. When an appropriate control signal appears on line 868, relay 1332 closes its contacts and couples together wire pairs 1333 and 1336. Relay 1338, controlled by line 869, selectively couples wire pair 1336 to either wire pair 1340 or to wire pair 1342. Wire pairs 1340 and 1342 comprise four-wire line 5, as shown in FIG. 1. Thus, this interface permits a testing unit to test telephone communication lines which have been accessed by the TTA unit using either four-wire MDF line 9 and MDF interface 1280 or test trunk 7 of FIG. 1 and test trunk interface of FIG. 11 discussed below.

Figure 10:
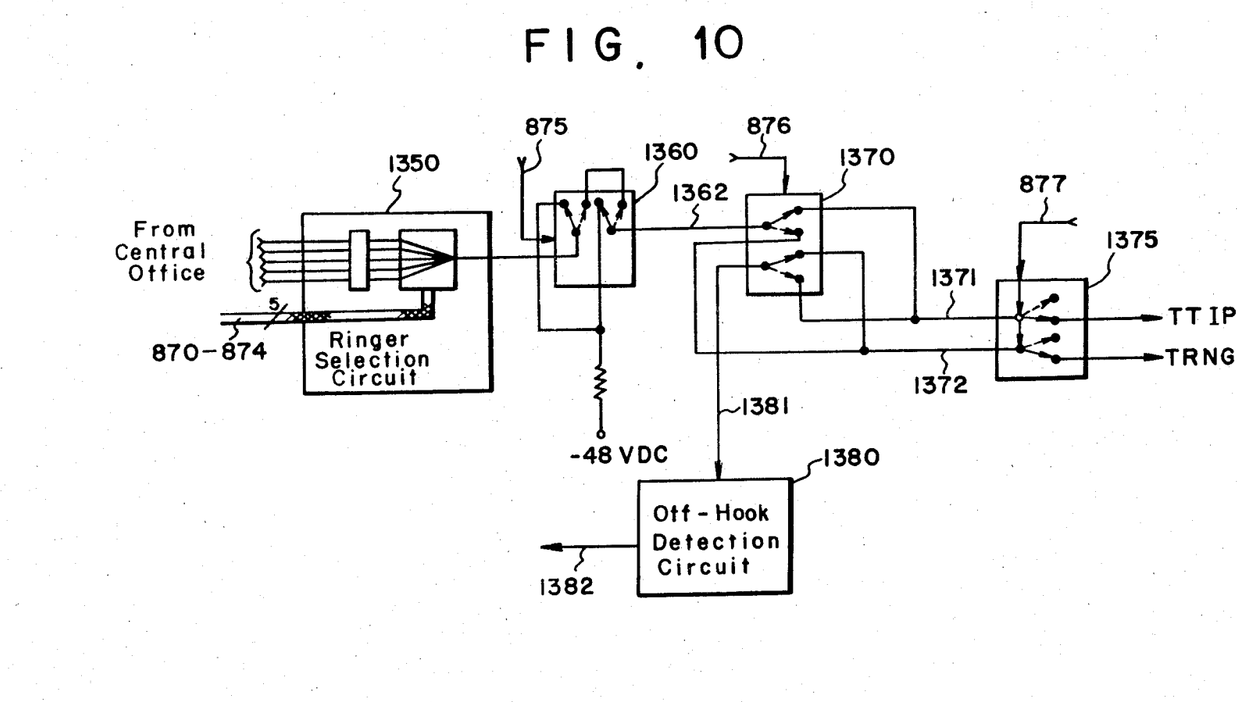
FIG. 10 shows a ring select circuit, relays for coupling ring signal to a potential source and to the test bus, and an on-hook detection circuit.

FIG. 10 shows the circuitry used to apply a ringer signal to a subscriber loop, comprising a ring selector circuit 1350 and relays 1360, 1370 and 1375. In the usual case, the TTA receives several ring signals, each having a different frequency, from a Central Office. In the presently preferred embodiment of the TTA unit, five such signals are received. In accordance with control signals received over lines 870–874, said circuit selects one of the received ringer signals and couples it to relay 1360. Relay 1360 is a double pole, double throw relay operated by control line 875. When in one switching position, relay 1360 couples the ringer signal directly to line 1362. When in the other switching position, relay 1360 couples the ringer signal to a −48 VDC bias voltage, so that a subscriber off-hook condition can be detected by off-hook detection circuit 1380.

Relay 1370, controlled by line 876, then couples the ringer signal to either line 1371 or line 1372, while at the same time connecting the non-coupled line to off-hook detection circuit 1380 over line 1381. Said circuit couples a status signal to line 1382 from which the microprocessor can determine whether a subscriber's phone is off-hook or on-hook.

When operated by an appropriate control signal on line 877, relay 1375 couples 1371 to ttip line and line 1372 to trng line of the test bus. Thus, when said relay is closed and relay 1370 is in one switching position, a ringer signal is applied to the ttip line while trng line is coupled to ringer detection circuit, and when relay 1375 is closed and relay 1370 is in the other switching position, the ringer signal is coupled to the trng line while the ttip line is coupled to off-hook detection circuit 1380.

Figure 11:
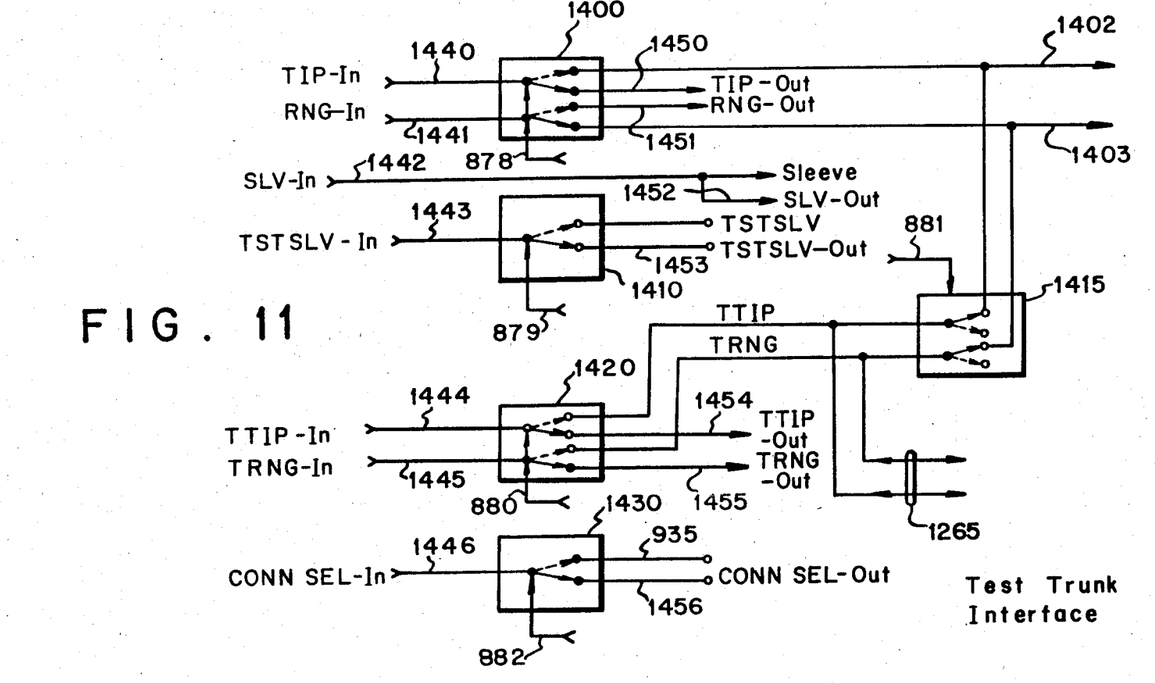
FIG. 11 depicts a test trunk interface comprising test trunk lines and relays for selectively coupling said lines to the TTA unit.

FIG. 11 illustrates a test trunk interface by which the TTA can access telephone communication lines, comprising relays 1400, 1410, 1415, 1420, and 1430. Incoming test trunk lines 1440–1446 are coupled either to outgoing lines 1450–1456 or are instead coupled to various lines for use by the TTA unit.

Tip-in and ring-in lines 1440, 1441 are used by the TTA to operate test distributor telephone equipment. When a control signal on line 878 switches double pole, double throw relay 1400 to one positions lines 1440, 1441 are coupled to lines 1402, 1403, respectively; and when said relay is switched into the other position, they are coupled to tip-out and ring-out lines 1450, 1451.

Slv-in line 1442 is coupled both to slv-out line 1452 and sleeve line, as shown in FIG. 11. By manipulating the sleeve lead, the TTA unit can gain control of test distribution equipment and use it to access communication lines. Single pole, single throw relay 1410, controlled by line 879, couples tstslv-in line 1443 either to TSTSLV when in one switching position, thereby providing status information about a subscriber loop accessed by the test distributor, or to tstslv-out line 1453 when in the other position.

Ttip-in and trng-in lines 1444, 1445 can be selectively coupled to either ttip-out 1454 and trng-out 1455 or to ttip and trng by relay 1420, which is operated by control line 880. Lines 1444 and 1445 are coupled by the test distributor to subscriber loops. In addition, ttip and trng can be selectively coupled to said tip-in and tip-out lines 1440, 1441 by relay 1415, when an appropriate control signal is presented to said relay over line 881, and causes it to close its contacts. Note that dial pulses from lines 1402, 1403, and DTMF or MF tones can be coupled to ttip-in, trng-in or tip-in, trng-in, depending upon the switching positions of the above mentioned relays.

To permit the TTA to sequentially step through a series of lines without individually dialing each line, a stepper signal can be applied from line 935 to conn sel-in line when relay 1430 couples line 1446 to conn sel. When said lines are not so coupled, line 1446 is coupled to line 1456.

While the invention has been described in connection with specific embodiments, it is evident that numerous alternatives, modifications, and variations will be apparent to those skilled in the art in light of the foregoing description.

What is claimed is:

1. Apparatus for accessing communication lines comprising:
   a signal line,
   central processing means,
   a memory in which is stored a program for controlling said central processing means,
   first coupling means responsive to signals from said central processing means for coupling said communication lines to said signal line,
   means responsive to signals from said central processing means for generating dialing signals,
   means for connecting said dialing signals to said signal line,
   means responsive to signals from said central processing means for detecting signals received on said signal line from said communication lines, and
   second coupling means responsive to signals from said central processing means for coupling said signal line to a testing means not controlled by said central processing unit whereby communication lines accessed by said apparatus are connected to said testing means.

2. The apparatus of claim 1 wherein said means for generating dialing signals includes means for generating dial pulse signals and means for generating multifrequency tones.

3. The apparatus of claim 2 wherein said means for generating dialing signals further comprises means for generating a howler signal.

4. The apparatus of claim 1 further comprising an input/output means for receiving instructions and for providing information generated in response to such instructions.

5. The apparatus of claim 4 wherein said input/output means is an RS-232 interface.

6. The apparatus of claim further comprising means for detecting whether said second coupling means is busy.

7. The apparatus of claim 1 wherein said first coupling means comprises means for accessing a communication line using main distribution frame switching equipment.

8. A means for generating a tone comprising:
   an integrated circuit chip for generating DTMF tones, having a first input means for selecting one of a plurality of low frequency tones, a second input means for selecting one of a plurality of high frequency tones, a third input means for receiving a source signal from which said low frequency and high frequency tones are generated and an output at which is provided the signal formed by mixing the selected low frequency tone with the selected high frequency tone;

means for coupling a signal for selecting a tone to only one of said first and second input means only; and means for selectively altering the frequency of said source signal, whereby a plurality of signal frequency tones can be generated at the output of said integrated circuit chip.

9. In an apparatus for accessing communication lines comprising a signal line, central processing means and a memory in which is stored a program for controlling said central processing means, a method of operating such apparatus comprising the steps of:

coupling said communication lines to said signal line in response to signals from said central processing means, generating dialing signals in response to signals from said central processing means, connecting said dialing signals to said signal line, detecting signals received on said signal line from said communication line in response to signals from said central processing means, and coupling said signal line in response to signals from said central processing means to a testing means not controlled by said central processing means, whereby communication lines accessed by said apparatus are connected to said testing means.

10. The method of claim 9 further comprising the steps of gaining access to a test distributor switching means and determining whether a subscriber's communication lines are busy.

* * * * *